Dec. 29, 1936.   M. E. COLLINS   2,066,140
SOUND RECORDER
Filed Feb. 28, 1934

INVENTOR
MILFORD E. COLLINS
BY
ATTORNEY

Patented Dec. 29, 1936

2,066,140

UNITED STATES PATENT OFFICE 2,066,140

SOUND RECORDER

Milford E. Collins, Collingswood, N. J., assignor to Radio Corporation of America, a corporation of Delaware Application February 28, 1934, Serial No. 713,293

3 Claims. (Cl. 274—5)

The present invention relates to sound recorders of the sound-on-film type, and more particularly to the variety thereof intended to record sound on sound-and-picture film which is adapted to be divided longitudinally after the film is completed.

One object of my invention is to provide a recorder readily interchangeable between film of several widths.

Another object of my invention is to provide a recorder which can record a plurality of sound records on a single film.

Another object of my invention is to provide a novel adjustable optical system which can be shifted accurately to proper position for a plurality of sound-tracks on a multiple-width film.

Figure 1:
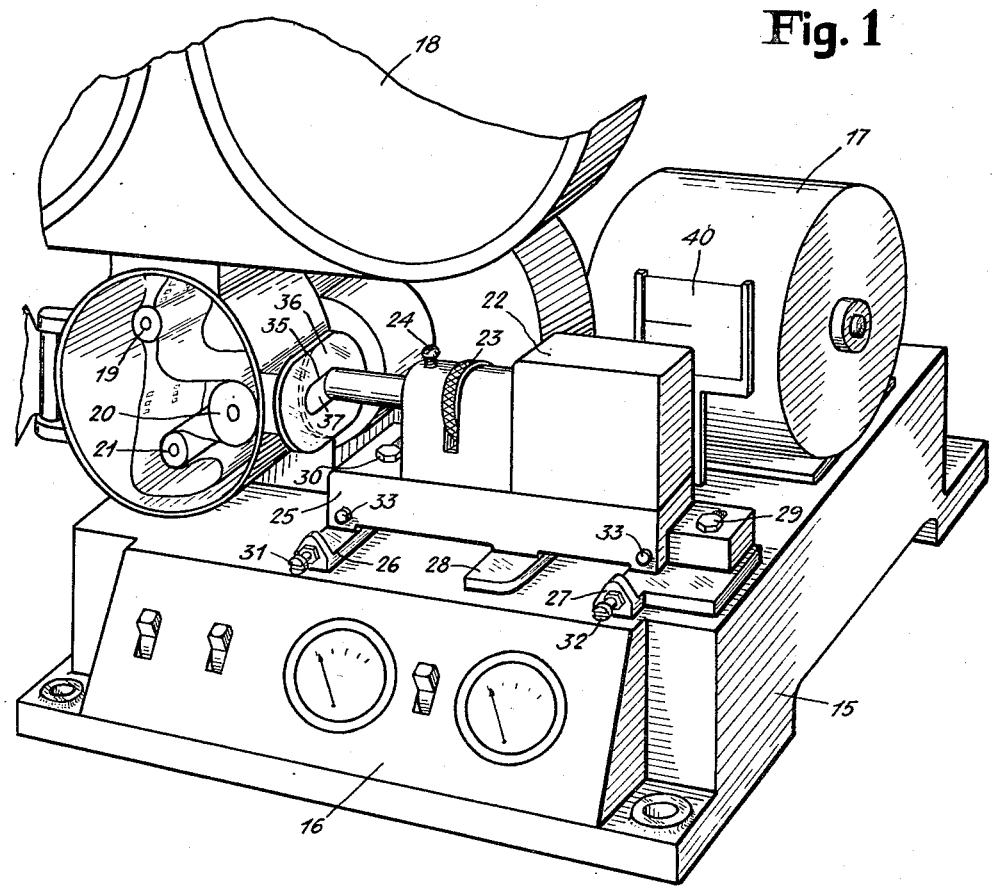
Figure 1 is a general view of my improved recorder.
Figure 2:
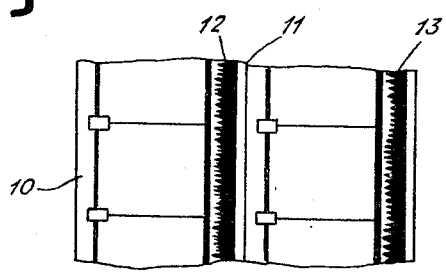
Figure 2 is an illustration of a preferred form of film for which the apparatus of Fig. 1 is adapted.

Referring first to Fig. 2: One of the various types of film now in use has a width of 17.5 mm. which is exactly one-half of the width of "standard" 35 mm. film, and this figure illustrates a particular variety of 17.5 mm. film for which my recorder is adapted. The film 10 is 35 mm. in width, and after recording is split along the line 11 to provide two films of the proper width.

It is desirable, in recording such film, to provide an optical system which can record upon both sound-tracks 12 and 13.

I provide a recorder generally indicated at 15 of any usual type including an appropriate control panel 16, a driving motor 17, film magazine 18, and an appropriate film feeding magazine comprising the sprockets and drum 19, 20 and 21. Sound is recorded upon the film as it passes over the drum 20 which is driven at a constant speed. The recording optical system is generally indicated at 22 and is provided with a customary focusing adjustment 23. This optical system is also provided with a locking means 24 for clamping the lenses in focussed position.

The optical system includes a base 25 which is slidable upon the cradles 26 and 27 and upon the supporting plate 28. The upper surfaces of these cradles 26 and 27 and the plate 28 are machined accurately, and the lower surfaces of the base 25 are also machined accurately in order that there may be no vertical shifting of the optical system when it is moved laterally. The base 25 is slotted at each end to receive the capscrews 29 and 30 which hold the base 25 upon the recorder. The cradles 26 and 27 are each provided at both ends with appropriate stop screws 31 and 32, and the base 25 of the optical system is provided at each side of each end with an appropriate hardened button 33 which cooperates with the stop screws. It will be apparent that when the optical system is shifted bodily to one side or the other, the position thereof will be determined by the contacting of the buttons 33 with the screws 31 and 32 or the corresponding screws at the opposite ends of the cradles, and if these screws are properly adjusted, the optical system will be maintained accurately perpendicular to the plane of movement of the film at the recording point.

The objective end of the optical system passes through an elliptical aperture or slot 35 which is of such length as to permit the movement of the optical system over the entire range defined by the cradles without obstruction. In order to prevent stray light reaching the film, it is necessary to close the portion of these slots not occupied by the optical system, and I accordingly make the slot in a hollow member 36 in which is located a slidable plate 37 which fits snugly around the optical system and which is made sufficiently smaller than the member 36, as indicated in dotted lines, so as to be shiftable within the member 36 in accordance with the movements of the optical system itself.

Within the optical system I provide a mirror of appropriate type for deflecting a portion of the recording beam as disclosed in Zworykin Patent 1,834,197 or Taylor Patent 1,847,636, and this deflected beam is directed to the screen 40 which is attached to the base of the recorder. Since the plane of this screen is perpendicular to the plane of movement of the optical system, no movement of the screen is necessary to retain the image thereupon, the image only being somewhat changed in size upon movement of the optical system.

Having now described my invention, I claim:

1. A sound recorder comprising means for moving film past a recording point, an optical system for recording sound upon the said film, means for accurately fixing two limiting parallel positions of movement of the optical system in relation to the said film, and a stationary viewing screen on the recorder positioned to cooperate with the optical system at either position.

2. In a sound recorder, an optical system, a base for said optical system, a plurality of cradles supporting said base, stop means on said cradles for determining parallel positions of the limits of movement of said optical system, and means on said base co-operating with said stop means.

3. In a sound recorder, an optical system, a base for said optical system, a plurality of cradles supporting said base, stop means on said cradles for determining parallel positions of the limits of movement of said optical system, means on said base co-operating with said stop means, and means for retaining the said base upon said cradles.

MILFORD E. COLLINS.